United States Patent [19]
Pedersen et al.

[11] Patent Number: 5,638,543
[45] Date of Patent: Jun. 10, 1997

[54] METHOD AND APPARATUS FOR AUTOMATIC DOCUMENT SUMMARIZATION

[75] Inventors: Jan O. Pedersen, Palo Alto, Calif.; John W. Tukey, Princeton, N.J.

[73] Assignee: Xerox Corporation, Stamford, Conn.

[21] Appl. No.: 71,114

[22] Filed: Jun. 3, 1993

[51] Int. Cl.⁶ ................................ G06F 17/30
[52] U.S. Cl. ................................ 395/751
[58] Field of Search ............... 364/419.19, 419.01, 364/419.08, 419.1, 419, 600

[56] References Cited

U.S. PATENT DOCUMENTS 5,077,668  12/1991  Doi ........................... 364/419
5,297,027  3/1994  Morimoto et al. ........ 364/419.19

OTHER PUBLICATIONS

Gerald Salton, *Automatic Text Processing*. (Addison–Wesley, 1989) pp. 439–445.

Primary Examiner—Gail O. Hayes
Assistant Examiner—Charles Kyle
Attorney, Agent, or Firm—Oliff & Berridge

[57] ABSTRACT

Regions of a document such as sentences and blocks of sentences are scored and classified based upon their scores. An abstract of the document can be formed from the classified sentences. Sentences are classified by the use of words classified as stop words and vanish words. Sentences are scored based on the number of stop words and the number of strings of connected stop words, called stop-word runs, contained in the sentence. Passionate sentences, which usually contain information which the writer has strong feelings about, such as joy, admiration, or sadness, are identified. This method can also select sentences that are contrapassionate, which the writer may either have to strengthen or have inserted to complete the record and provide continuity or information.

59 Claims, 8 Drawing Sheets

"I" "Inc" "Ltd" "a" "able"
"about" "above" "across" "act" "actual"
"actually" "after" "afterward" "again" "against"
"ago" "ahead" "all" "allow" "almost"
"alone" "along" "already" "also" "although"
"always" "am" "among" "amongst" "an"
"and" "another" "any" "anyhow" "anyone"
"anything" "anyway" "anywhere" "approach" "appropriate"
"are" "argue" "arise" "around" "as"
"aside" "assume" "at" "avail" "avoid"
"away" "awhile" "b" "back" "bad"
"be" "because" "become" "before" "beforehand"
"begin" "behave" "behind" "being" "below"
"beside" "best" "better" "between" "beyond"
"big" "both" "bring" "but" "by"
"c" "can" "care" "cause" "certain"
"certainly" "clear" "clever" "co" "come"
"comment" "completely" "consider" "considerate" "convenient"
"could" "course" "cove" "d" "de"
"decide" "decision" "despite" "didn" "different"
"difficult" "down" "during" "e" "each"
"earlier" "effect" "eg" "either" "else"
"elsewhere" "end" "enough" "entirely" "especially"
"essential" "etc" "even" "eventual" "ever"
"every" "everybody" "everyone" "everything" "everywhere"
"evident" "exact" "example" "except" "exclusively"
"exist" "expect" "explain" "extra" "extract"
"extreme" "f" "fact" "for" "few"
"find" "first" "follow" "following" "for"
"fortunate" "forward" "found" "from" "full"
"fully" "further" "furthermore" "g" "gain"
"gather" "gave" "generally" "get" "give"
"given" "go" "going" "gone" "good"
"got" "great" "guess" "h" "ha"
"hadn" "hand" "happen" "happy" "have"
"he" "hear" "hence" "her" "here"

FIG.4

| | | | | |
|---|---|---|---|---|
| "hereafter" | "hereby" | "herein" | "hereupon" | "hers" |
| "herself" | "him" | "himself" | "his" | "hold" |
| "hope" | "how" | "however" | "i" | "idea" |
| "ideal" | "ie" | "if" | "ified" | "imagine" |
| "immediate" | "important" | "in" | "inc" | "include" |
| "indeed" | "instead" | "into" | "it" | "its" |
| "itself" | "j" | "just" | "k" | "know" |
| "l" | "la" | "large" | "last" | "later" |
| "latter" | "lay" | "least" | "leave" | "less" |
| "lesser" | "lest" | "let" | "lie" | "like" |
| "likely" | "little" | "ll" | "look" | "lot" |
| "low" | "ltd" | "m" | "many" | "mark" |
| "may" | "maybe" | "me" | "mean" | "meanwhile" |
| "mere" | "might" | "mild" | "more" | "moreover" |
| "most" | "mostly" | "much" | "must" | "my" |
| "myself" | "n" | "name" | "near" | "nearly" |
| "necessary" | "nee" | "neither" | "nevertheless" | "next" |
| "nice" | "no" | "non" | "none" | "noone" |
| "nor" | "notably" | "note" | "notion" | "notwithstanding" |
| "now" | "nowhere" | "o" | "obvious" | "occur" |
| "of" | "off" | "often" | "ok" | "okay" |
| "on" | "once" | "one" | "only" | "onto" |
| "or" | "other" | "otherwise" | "ought" | "our" |
| "ourselves" | "out" | "over" | "own" | "p" |
| "particular" | "per" | "perfect" | "perhaps" | "please" |
| "plenty" | "possible" | "preferably" | "pretty" | "previous" |
| "probably" | "problem" | "produce" | "prompt" | "proper" |
| "propos" | "propose" | "put" | "q" | "quick" |
| "quite" | "r" | "rather" | "re" | "ready" |
| "really" | "reasonable" | "reasonably" | "regard" | "relatively" |
| "relevant" | "respect" | "s" | "same" | "saw" |
| "say" | "see" | "seem" | "send" | "sense" |
| "serious" | "serve" | "several" | "shall" | "she" |
| "shortly" | "should" | "show" | "similar" | "simple" |
| "simply" | "since" | "slight" | "slightly" | "slow" |
| "so" | "some" | "somebody" | "somehow" | "someone" |
| "something" | "sometime" | "sometimes" | "somewhat" | "somewhere" |
| "soon" | "sorry" | "specific" | "specifically" | "stay" |
| "still" | "strong" | "such" | "sufficient" | "suggestion" |
| "supple" | "sure" | "t" | "tend" | "terrible" |
| "than" | "that" | "the" | "their" | "them" |
| "themselves" | "then" | "thence" | "there" | "thereafter" |

FIG.5

| | | | | |
|---|---|---|---|---|
| "thereby" | "therfore" | "therein" | "thereupon" | "these" |
| "they" | "thing" | "this" | "those" | "though" |
| "thought" | "through" | "throughout" | "thru" | "thus" |
| "til" | "till" | "time" | "tire" | "to" |
| "together" | "too" | "total" | "toward" | "treat" |
| "tried" | "trouble" | "truly" | "try" | "two" |
| "u" | "under" | "unless" | "unlikely" | "until" |
| "up" | "upon" | "us" | "use" | "useful" |
| "useless" | "usual" | "usually" | "v" | "various" |
| "ve" | "very" | "via" | "view" | "w" |
| "way" | "we" | "well" | "what" | "whatever" |
| "when" | "whence" | "whenever" | "where" | "whereafter" |
| "whereas" | "whereby" | "wherein" | "whereupon" | "wherever" |
| "whether" | "which" | "while" | "whither" | "who" |
| "whoever" | "whole" | "whom" | "whose" | "whosever" |
| "why" | "will" | "with" | "within" | "without" |
| "would" | "x" | "y" | "yes" | "yet" |
| "you" | "your" | "yours" | "yourself" | "yourselves" |
| "z" | | | | |

FIG.6

| | | | | |
|---|---|---|---|---|
| "a" | "all" | "an" | "any" | "any" |
| "each" | "each" | "her" | "his" | "its" |
| "ordinary" | "other" | "our" | "particular" | "same" |
| "similar" | "some" | "some" | "sort" | "special" |
| "specially" | "the" | "their" | "these" | "those" |
| "totally" | "usually" | "which" | "whose" | |

FIG.7

METHOD AND APPARATUS FOR AUTOMATIC DOCUMENT SUMMARIZATION

BACKGROUND OF THE INVENTION

1. Field of the Invention

This invention relates to methods and apparatus for creating abstracts of documents. More particularly, through the detection of words and/or phrases that indicate emphasis, this invention automatically ranks sentences in a document which can be used to create an abstract or to otherwise edit the document.

2. Description of Related Art

Document abstracts enable the reader to save time because a judgment as to the relevance of a document can be made without scanning the entire document. There are two types of abstracts. The first type of abstract summarizes the main contents of the document. The second type of abstract does not summarize the document, but instead explains the general subject matter of the document.

Document abstracts are typically required with formal publications. However, not all documents (as originally prepared) have abstracts, and not all the abstracts manually prepared by people are adequate. Therefore, a practical and automatic construction of useful document abstracts is needed.

Automatic document abstracts are clearly useful in themselves, but they can also be components of larger systems. For example, a document retrieval system typically mows from queries to documents, i.e., from a few words to all words in the document. It may be beneficial to reduce the step size of this jump by moving instead from queries to abstracts to documents. In particular, an arbitrarily long document could be compressed to fit on one screen by applying a suitable reducing summarization.

Some automatic extracting systems distinguish between words occurring in the plain text and words occurring in titles and captions. The plain text may receive standard term-weighing, and special words in the title or caption may receive special treatment based on the location of the terms in the specific document. Some systems simply choose the first sentence of each paragraph. Another method gives special treatment to high frequency words, to rarely used words, specific phrases, or even specific paragraphs. Then each sentence or paragraph is scored depending on the frequency of the words or phrases. Such abstract forming techniques are described in *Automatic Text Processing* (Gerald Salton, Addison-Wesley, 1989).

SUMMARY OF THE INVENTION

In the invention, only extremely simple language analysis is needed. In a preferred embodiment, a word by word comparison of text words is made with two word lists—one small, the other of moderate size.

In accordance with the invention, a document is treated as a sequence of individual sentences (or blocks of text spanning plural sentences). A subset of those individual sentences (or blocks) is chosen that both achieves a desired text reduction and serves as a useful representative sample of the document. This strategy neatly side-steps language generation issues since the output is guaranteed to be as well-formed as the input. However, the usefulness requirement demands that these subsets are more appealing than those produced by elementary approaches, such as randomly selecting sentences or selecting the first sentence of each paragraph to create the subset.

The invention searches a document (usually structured as words within sentences within paragraphs) consisting of n sentences and chooses a desired number of selected sentences, ρn, where ρ is the reduction factor. Two lists of words, a STOP list, supplemented by a VANISH list (which may be empty), are preferably used in these searches. A word is a stop word if it appears on the STOP list, and is otherwise a content word. Certain stop words are vanish words because they also appear on the VANISH list. The STOP and VANISH lists may be extended by placing words in equivalence classes (i.e., stemmed) based on suffix or morphological analysis. The frequency of individual words within the document, or even within individual paragraphs and sentences, can be recorded to assist in later selection. After flagging the stop words, the sentences form alternating runs of stop words and content words. The number of stop-word runs are used to score the sentences. Based on their score, certain sentences may be used to form the abstract.

The procedures described here aid in the detection of sentences that bear on matters of importance, or more generally passion, to the writer.

In order to be practical, strategies that depend on full natural language understanding preferably should not be used. The techniques used in the invention depend on the asymmetry in usage of stop words, or of short words. This visible usage of stop words acts as a surrogate for some deeper structure in the text. The sentences identified by the techniques of the invention as highly passionate usually are sentences describing something about which the writer has strong feelings—whether joy, admiration, or sadness, for example.

BRIEF DESCRIPTION OF THE DRAWINGS

The invention is illustrated in the accompanying drawings, in which like reference numerals are used to denote like or similar parts, and wherein:

FIGS. 4–6 are a sample STOP list;

FIG. 7 is a sample VANISH list;

DETAILED DESCRIPTION OF PREFERRED EMBODIMENTS

Figure 1:
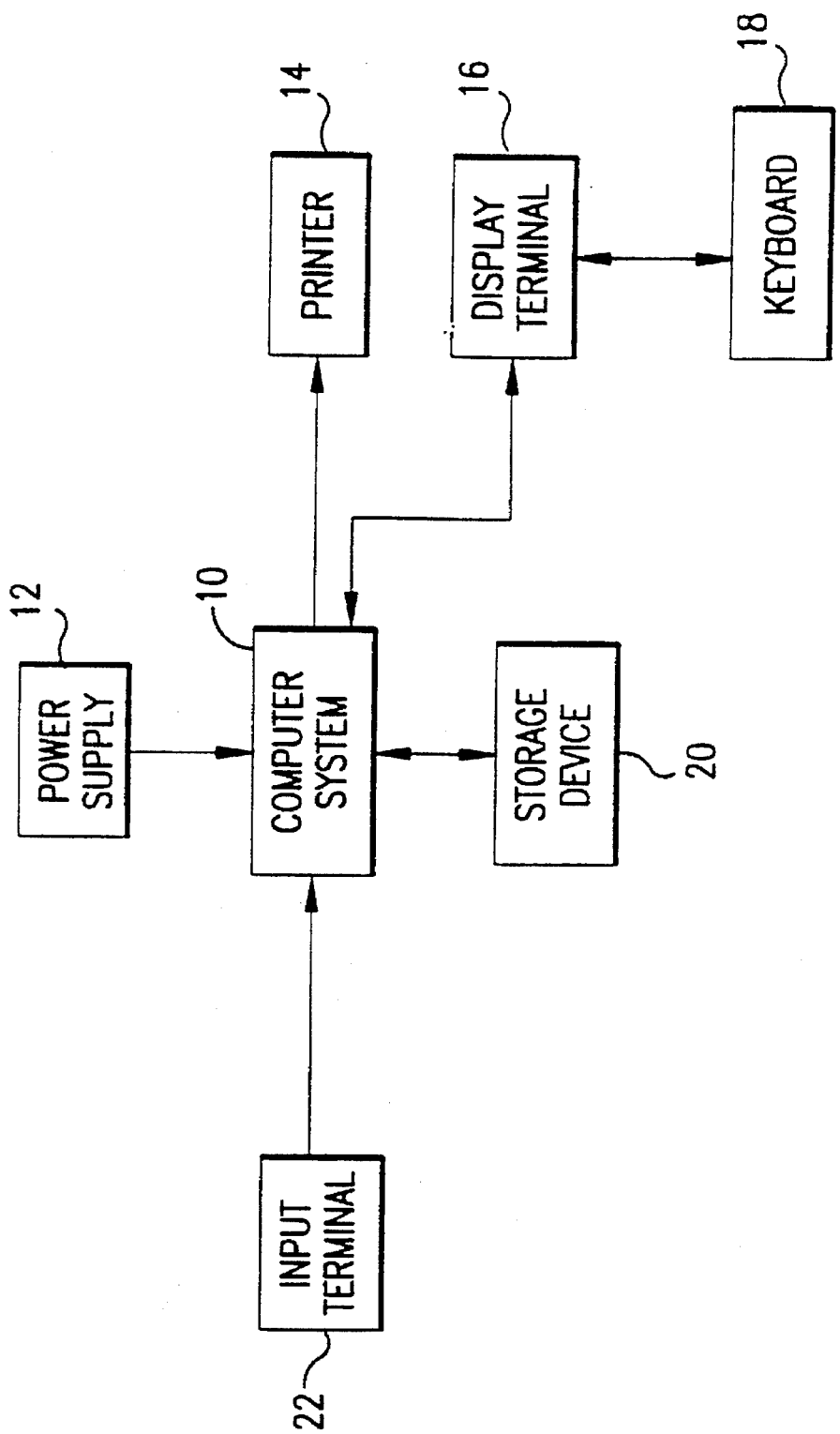
FIG. 1 is a schematic view illustrating a standalone computer system wherein the invention might be utilized.

Referring to FIG. 1, a schematic view illustrating a stand-alone computer system is shown. A power supply 12 supplies power to a computer system 10, which has a CPU (not shown) and memory (not shown). An input terminal 22 loads the document text into the computer 10. Some examples of input terminals are: a document scanner with or without an optical character recognizer (OCR), a word-processor, a floppy disc drive, a modem, etc. A storage device 20 stores the scores of the sentences along with any selected text. The scored sentences can be output to the printer 14 and the display terminal 16. The operator can use the keyboard 18, for example, to input commands and to modify the sentences into an abstract (if desired).

In the following preferred embodiments, the document is divided into regions of text that are scored. Each region can be a sentence, a fragment of a sentence, a block of sentences (perhaps delimited to attain a desired minimum total number of stop-word runs), a half-paragraph, or paragraphs. Stop words are identified by either comparing the text to a STOP list or by flagging words of certain lengths as stop words. Vanish words, which are a subset of stop words, are identified by either comparing the stop words to a VANISH list or by flagging stop words of certain lengths as vanish words. The regions (e.g., sentences) of the document are then scored depending on the number of stop words, vanish words and groups of stop words in each region. A certain number of regions of the document are selected based on the score of each region. A user can form an abstract based on these selected regions or the abstract can be formed automatically.

Figure 2:
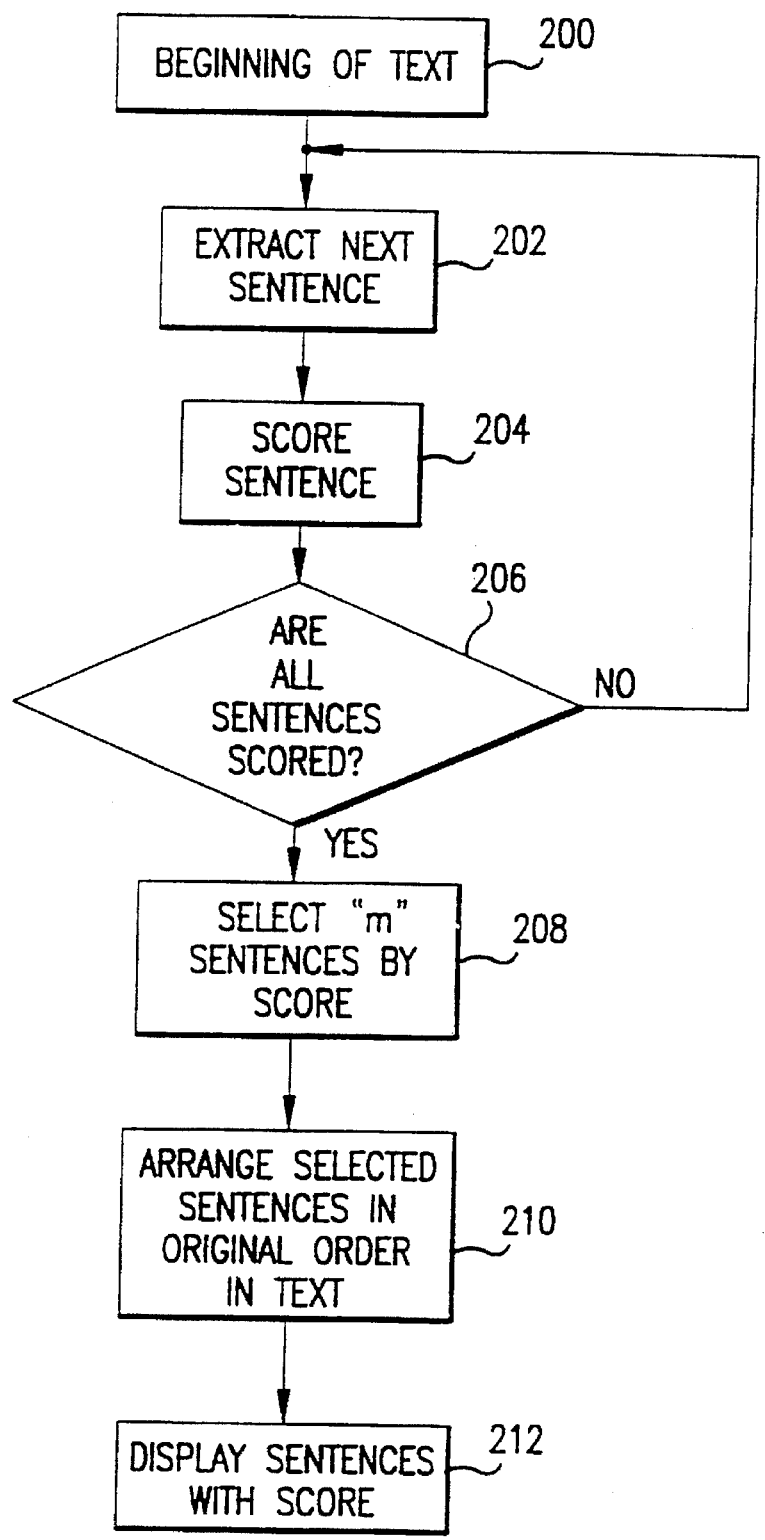
FIG. 2 is a flow diagram for representing one method of automatically summarizing documents.

Now referring to FIG. 2, a flow diagram for representing a method of automatically summarizing documents is shown. At step 200, the document is input into the computer. The first sentence (or block of words) is extracted at step 202. The sentence is scored by a method of scoring (described in more detail below) at step 204. At Step 206, the computer checks to see if all sentences have been extracted and scored. If there is more text, flow returns to step 202 to extract the next sentence. If all of the text has been scored, then flow proceeds to step 208 where a predetermined number of sentences are selected based on the scores of each sentence. In step 210, the selected sentences are arranged in the order that they appeared in the text, i.e., not in order of their scores. Alternatively, an operator could rearrange the sentences, or the sentences could be arranged according to their scores. In step 212, these sentences are displayed on terminal 16 or otherwise output, for example, by printer 14 (optionally with their corresponding scores).

The first preferred embodiment may be referred to as a STOP/VANISH method. This method detects emphasis by measuring patterns of stop word use. This embodiment is based on the empirical observation that passionate sentences tend not to have long runs of stop words. Hence, a score that measures the average stop-word run length of a given sentence (or block of words) acts as an inverted indicator of passion. Sentences are sorted in ascending order of this score, and the pn lowest scoring sentences, preferably arranged in their original reading order, are chosen as an abstract.

In particular, let the $i^{th}$ sentence, $S_i$, be represented by a sequence of stop-word runs, $S_{i,j}$. The following equation works well as defining an indicator for passion:

$$\text{score}(S_i) = \frac{\Sigma_j |S_{i,j}| + K}{|S_i|}$$

$$= \text{Ave}(|S_{i,j}|) + K/|S_i|$$

where $|S_i|$ is the number of stop word runs in a sentence; $|\{S_{i,j}\}|$ is the number of stop words in the $j^{th}$ stop-word run; and the $K/|S_i|$ term penalizes sentences with few stop-word runs (whose mean run lengths are inherently more variable.) K can be any numeral including a fraction—a typical value would be 3.

Let $C_p$ be the pn lowest scoring sentences. The abstract is then $C_p$ in index order. That is:

$$C_p = \{S_{i1}, S_{i2}, \ldots S_{ipn}\},$$

where $i_1 < i_2 < \ldots < i_{pn}$.

The identification of important sentences can be improved by providing a short list of vanish words that do not contribute to the length of a stop-word run. That is, $|S_{i,j}|$ is modified to be the count of words in the stop-word run $S_{i,j}$ not on a VANISH list, i.e., the number of stop words minus the number of vanish words. This count can be zero. The VANISH list is (optionally) provided so that words that simply focus, or personalize, associated words are not counted. For example, suppose the STOP list includes all the closed class words (determiners, pronouns, prepositions, etc.) and the VANISH list includes "a", "an", "its", and "their"; then "of a", "of an", "of its", and "of their" would each be counted as a length one stop-word run (equivalent to "of"). A stop-word run consisting entirely of words on the VANISH list is counted as a zero length stop-word run.

Another possible embodiment involves performing the above method on word windows (or blocks of words), each comprised of either a fixed number of words or a fixed number of stop word runs, over the text and selecting those blocks with the lowest stop-word run scores. These blocks might span one or more sentences, the entirety of which could be considered an emphasized text segment. Alternatively, sentences more than a specified fraction of whose length fell in such a block could be selected.

Figure 3:
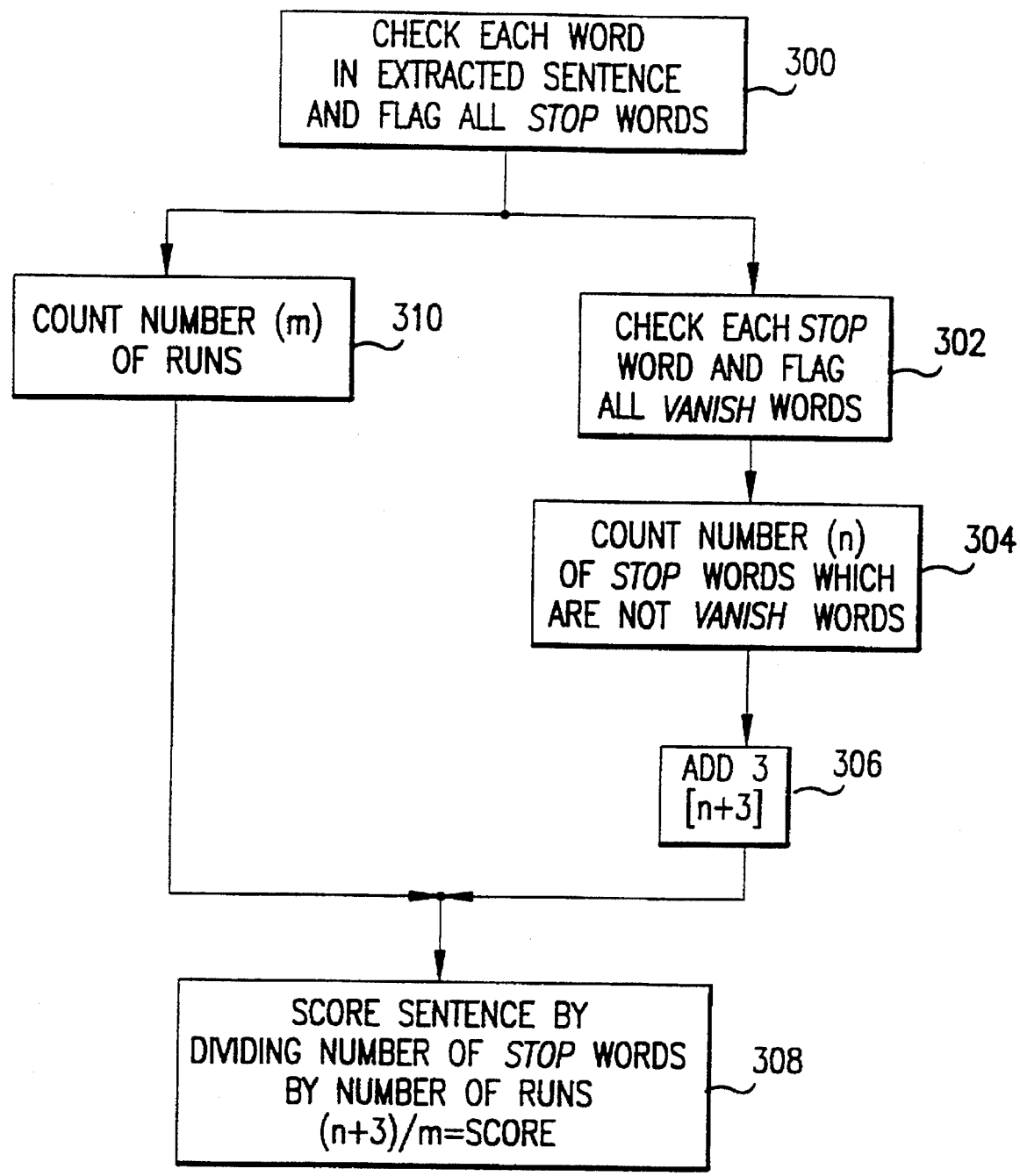
FIG. 3 is a flow diagram illustrating a method for scoring sentences (or other blocks of text) according to a first preferred embodiment.

Referring to FIG. 3, a flow diagram for scoring sentences (step 204 of FIG. 2) according to the first preferred embodiment is shown. As explained above, this process could also be used on blocks of words, instead of on sentences. At step 300, each word in the extracted sentence is compared to words on a STOP list. A representative STOP list is shown in FIGS. 4–6. The stop words are flagged. At step 302, each stop word is compared to words on a VANISH list. Each vanish word is (additionally) flagged. The VANISH list is an optional feature of this preferred embodiment. The vanish words are common words which personalize associated words, and therefore, are not counted as contributing to the length of a stop-word run. A representative VANISH list is shown in FIG. 7. In step 304, the stop words which were not flagged as vanish words are counted and stored as n. In step 306, the number three (3) is added to n and stored. Adding a number is optional and the value of the number (which need not be an integer) can be changed. As the minimum size of the sentences (or blocks) increases, the need for adding the number part of the score may decrease.

In step 310, the number of runs is counted. A stop-word run is a block of adjacent stop words. The number of runs m is stored. In step 308, the number of stop words which are not vanish words is divided by the number of stop-word runs in the sentence. The resulting score (a modified average stop-run length) is the score of the sentence to be later used in selecting the most passionate sentences.

The following is an example of sentence scoring using the method of the first embodiment. The sentences of text below will be scored:

The most important invention that will come out of the corporate research lab in the future will be the corporation itself. As companies try to keep pace with rapid changes in technology and cope with increasingly unstable business environments, the research department has to do more than simply innovate new products. It must design the new technological and organizational "architectures" that make possible a continuously innovating company. Put another way, corporate research must reinvent innovation.

At the Xerox Palo Alto Research Center (PARC) we've learned this lesson, at times, the hard way. Xerox created PARC in 1970 to pursue advanced research in computer science, electronics, and materials science. Over the next decade, PARC researchers were responsible for some of the basic innovations of the personal computer revolution-only to see other companies commercialize these innovations more quickly than Xerox. (See the insert "PARC-": Seedbed of the Computer Revolution.") In the process, Xerox gained a reputation for "fumbling the future" and PARC for doing brilliant research but in isolation from the company's business.

That view is one-sided because it ignores the way that PARC innovations have paid off over the past 20 years. Still, it raises fundamental questions that many companies besides Xerox have been struggling with in recent years: What is the role of corporate research in a business environment characterized by tougher competition and nonstop technological change? And how can large companies better assimilate the latest innovations and quickly incorporate them in new products?"

Each sentence of this text is extracted and scored. The corresponding emphasis detection score is listed next to each sentence. The scoring used the emphasis detection equation with the optional VANISH list. In the following sentences: each stop-word run is underlined; and each vanish word is in italics.

2.8—*The* most important invention that will come out of *the* research lab in *the* future will be *the* corporation itself.

The score is calculated as follows:

$$\frac{(15 \text{ Stop Words} - 4 \text{ Vanish Words}) + 3}{5 \text{ Stop Runs}} = 2.8$$

1.7—As companies try to keep pace with rapid changes in technology and cope with increasingly unstable business environments, the research department has to do more than simply innovate new products.

1.6—It must design the new technology and organizational "architectures" that make possible a continuously innovating company.

3.5—Put another way, corporate research must reinvent innovation.

1.8—At the Xerox Palo Alto Research Center (PARC) we've learned this lesson, at times, the hard way.

1.8—Xerox created PARC in 1970 to pursue advanced research in computer science, electronics, and materials science.

1.8—Over the next decade, PARC researchers were responsible for some of the basic innovations of the personal-computer revolution—only to see other companies commercialize these innovations more quickly than Xerox.

2.5—(See the insert "PARC: Seedbed of the Computer Revolution.")

1.4—In the process, Xerox gained a reputation for "fumbling the future" and PARC for doing brilliant research but in isolation from the company's business.

2.6—That view is one-sided because it ignores the way that PARC innovations have paid off over the past 20 years.

1.9—Still, it raises fundamental questions that many company's besides Xerox have been struggling with in recent years: What is the role of corporate research in a business environment characterized by tougher competition and nonstop technological change?

2.2—And how can large companies better assimilate the latest innovations and quickly incorporate them in new products?

The lowest scoring sentence in this example is 'In the process, Xerox gained a reputation for "fumbling the future" and PARC for doing brilliant research but in isolation from the company's business.' followed closely by 'It must design the new technological and organizational "architectures" that make possible a continuously innovating company.' and 'As companies try to keep pace with rapid changes in technology and cope with increasingly unstable business environments, the research department has to do more than simply innovate new products.' These sentences may not carry the entire theme of this text fragment, but they are clearly among the most passionately stated. An abstract could be formed from these selected sentences.

The highest scoring sentences are considered contrapassionate. These contrapassionate sentences may have been inserted to strengthen the text, or to complete the record and provide continuity or information. These sentences can assist in creating the abstract.

A second preferred embodiment detects passionate sentences by examining the length of words instead of their identity. Therefore, a STOP list and a VANISH list are not necessary, but words are still classified as stop words or as vanish words. This compact scheme, referred to as the SHORT method, defines the words as follows:

a stop word has three or less letters; and
vanish words are all 1-letter and 3-letter words.
The scoring of the sentences is as follows:

$$(\text{lack of}) \text{ passion score} = \frac{3 + \Sigma \delta(r_i)}{|\{r_i\}|}$$

$$(\text{lack of}) \text{ contrapassion score} = \frac{3 + \Sigma 1 - \delta(r_i)}{|\{r_i\}|}$$

where $|\{r_i\}|$ denotes the number of runs; and $$\delta(r_i) = \begin{cases} 0, & \text{if all words in run } i \text{ are vanish words} \\ 1, & \text{else} \end{cases}$$

The most passionate sentences are those with the lowest (lack of) passion score. The most contrapassionate sentences are those with lowest (lack of) contrapassion score.

Selecting the most contrapassionate sentences may not be useful as a route to summarization, but can serve a useful purpose in suggesting possible edits. Therefore, the identification of contrapassionate sentences can be used as an editing tool.

Figure 8:
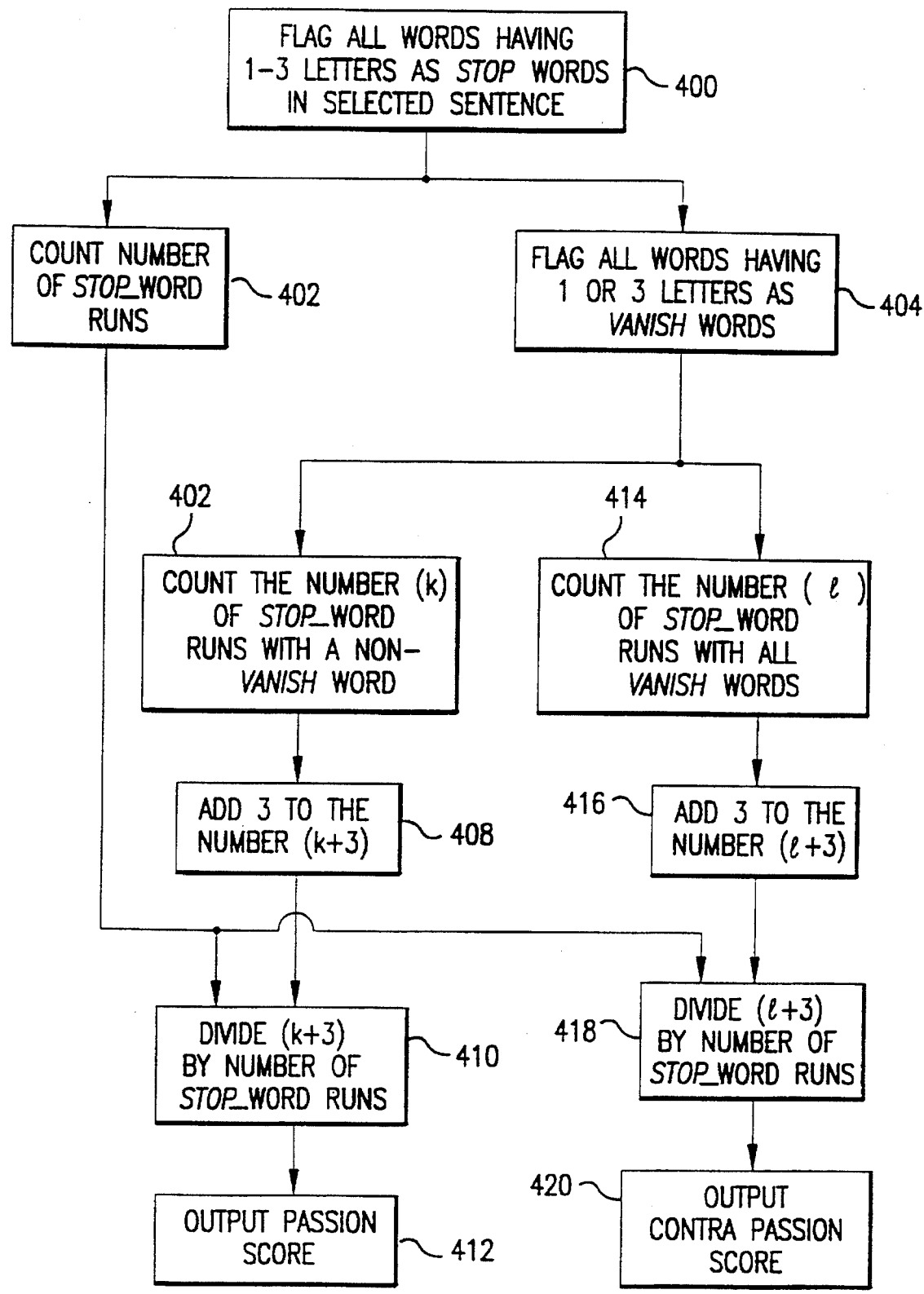
FIG. 8 is a flow diagram illustrating a method for scoring sentences (or other blocks of text) according to a second preferred embodiment.

Referring to FIG. 8, a flow diagram for scoring sentences (step 204 of FIG. 2) according to the second preferred embodiment is shown. At step 400, all words having three or less letters are flagged as stop words. In 402, the number of stop-word runs are counted. In step 404, any stop word that has one or three letters is flagged as a vanish word. In step 406, the number of stop-word runs which have a non-vanish word are counted and stored as k. The sum of k plus three (3) is stored in step 408. Similar to the previous embodiment, the adding of the numeral 3 (or any other number) is optional. Furthermore, the complete removal of the number makes the sum of the two scores (passion and contrapassion) always equal to one. In this specific instance, only one score (passion or contrapassion) is needed.

In step 410, the passion score is determined by dividing the result of step 408 by the result of step 402. The output of step 412 is the passion score for that selected sentence.

The contrapassion score is determined as follows. In step 414, each stop-word run that has all vanish words is counted and stored as a one. The sum of all of the stop-word runs with all vanish words is added to the numeral 3, in step 416. The result of the previous addition is stored. In step 418, the contrapassion score is determined by dividing the result of step 416 by the result of step 402. The output of step 420 is the contrapassion score for that selected sentence.

This method was performed on two documents which have two different texts:

1) *Research That Reinvents the Corporation*, Brown, John Seely, Harvard Business Review, January/February 1991, pp102–111. (The text has 236 sentences in 55 paragraphs or headings).
2) *Transcript of the Remarks in Moscow*, New York Times, 21 December 1990, p. A7. (Edward Shevardnadze's resignation speech which is translated by the BBC) (The speech has 65 sentences in 30 paragraphs).

The following extracted sentences are shown in original text order so that the eight most highly scoring sentences in each text which are scored for passion and contrapassion.

The difference between the two sets of selected sentences from each text are clear.

In the Brown article, the following sentences were scored as the eight most passionate (stop words are underlined and vanish words are in italics):

- Research must "coproduce" *new* technologies *and* work practices by developing with partners throughout *the* organization a shared understanding of *why* these innovations *are* important.

The passion score is determined as follows:

$$\frac{3 + 2 \text{ Stop-word Runs with a non-vanish word}}{7 \text{ Stop-word Runs}} = .71$$

The contrapassion score is determined as follows:

$$\frac{3 + 5 \text{ Stop-word Runs with all vanish words}}{7 \text{ Stop-word Runs}} = 1.14$$

- RIC is an expert system inside the copier that monitors the information technology controlling the machine and, using some artificial-intelligence techniques, predicts when the machine will next break down.
- Recently, Xerox introduce its most versatile office machine ever—a product that replaces traditional light-lens copying techniques with "digital copying," where documents are electronically scanned to create an image stored in a computer, then printed out whenever needed.
- They are storehouse of past problems and diagnoses, a template for constructing a theory about the current problem, and the basis for making an educated stab at a solution.
- The document was "unfinished" in the sense that the whole point of the exercise was to get the viewers to complete the video by suggesting their own ideas for how they might use the new technology and what these new uses might mean for the business.
- The Express team is exploring ways to use core technologies developed at PARC to help the pharmaceutical company manage the more than 300,000 "case report" forms it collects each year.

In the Brown article, the following sentences were ranked as the eight most contrapassionate:

- Still, it raises fundamental questions that many companies besides Xerox have been struggling with in recent years: What is the role of corporate research in a business environment characterized by tougher competition and nonstop technological change?

The passion score is calculated as follows:

$$\frac{3 + 6 \text{ Stop Runs with a non-vanish word}}{7 \text{ Stop-word Runs}} = 1.29$$

The contrapassion score is calculated as follows:

$$\frac{3 + 1 \text{ Stop Run with all vanish words}}{7 \text{ Stop-word Runs}} = .57$$

- As RIC collects information on the performance of our copiers—in real-world business environments, year in and year out—we will eventually be able to use that information to guide how we design future generations of copiers.
- In effect, technology will become so flexible that users will be able to customize it evermore precisely to meet their particular needs—a process that might be termed "mass customization."
- People use procedures to understand the goals of a particular file has to contain in order for a bill to be paid—not to identify the steps to take in order to get from here to there.
- In most cases, ideas generated by employees in the course of their work are lost to the organization as a whole.
- We thought of the unfinished document as a "conceptual envisioning experiment" an attempt to imagine how a technology might be used before we started building it.
- We are also involved in initiatives to get managers far down in the organization to reflect on the obstacles blocking innovation in the Xerox culture.
- One step in this direction is an initiative of Xerox's Corporate Research Group (of which PARC is a part) known as the Express project.

These sixteen sentences (8 most passionate and 8 most contrapassionate) were selected from 256 sentences. Someone can easily create an abstract from these selected sentences which would allow any reader to understand the basic premise behind the article.

In the Shevardnadze speech the following sentences were ranked as the eight most passionate:

- Second, I have explained repeatedly, and Mikhail Sergeyevich spoke of this in his speech at the Supreme Soviet that the Soviet leadership does not have any plans—I do not know, maybe someone else has some plans, some group—but official bodies, the Ministry of Defense—charges are made that the Foreign Minister plans to land troops in the Persian Gulf, in the region.
- Is it an accident that two members of the Parliament make a statement saying that the Minister of Internal Affairs was removed successfully and that the time has come to settle accounts with the Foreign Minister?
- Because at the congress a real struggle developed, a most acute struggle, between the reformers and—I will not say conservatives, I respect the conservatives because they have their own views which are acceptable to society—but the reactionaries, precisely the reactionaries.
- And this battle, it must be stated bluntly, was won with merit by the progressive section, the progressive members, delegates, the progressively minded delegates to the congress.
- On comrade Lukyanov's initiative, literally just before the start of a meeting, a serious matter was included on the agenda about the treaties with the German Democratic Republic.
- Not one person could be found including the person in the chair to reply and say simple that this was dishonorable that this is not the way not how things are done in civilized states.
- I will not name the publications, all manner of publications that pamyat society—I add the pamyat society to these publications—but what statements: down with the Gorbachev clique.
- I nevertheless believe that the dictatorship will not succeed, that the future belongs to democracy and freedom.

The following sentences were ranked as the eight most contrapassionate in the Shevardnadze speech:
- I have drawn up the text of such a speech, and I gave it to the secretariat, and the deputies can acquaint themselves with it—what has been done is the sphere of current policy by the country's leadership, by the President and by the ministry of Foreign Affairs, and how the current conditions are shaping up for the development of the country, for the implementation of the plans for our democratization and renewal of the country, for economic development and so on.
- In that case we would have had to strike through everything that has been done in recent years by all of us, by the whole country and by all of our people in the field of asserting the principles of the new political thinking.
- The third issue, I said there, and I confirm it and state it publicly, that if the interests of the Soviet people are encroached upon, if just one person suffers—wherever it may happen, in any country, not just in Iraq but in any other country—yes, the Soviet Government, the Soviet side will stand up for the interests of its citizens.
- And what is surprising, and I think we should think seriously: who is behind these comrades, and why is no one rebuffing them and saying that this is not so and that there are no such plans?
- Because many people think that the ministers who sit there or the members of the Government or the President, or someone else, are hired, and that they can do what they like with them.
- I would like to recall that it was against my will, without my being consulted, that my name, my candidacy was included for secret voting. And I had 800 against, 800 delegates voted against.
- No one knows what this dictatorship will be like, what kind of dictator will come to power and what order will be established.
- Let this be—and do not react and do not curse me—let this be my contribution, if you like, my protest against the onset of dictatorship.

Although this is a very different type of text from the Brown article above, an abstract of this speech which had 65 sentences has been condensed to 16 sentences. These eight selected passionate sentences represent the speaker evoking a great amount of passion in the speech. The contrapassionate sentences add information on the content and background of the speech. An abstract which describes the basic idea behind the speech can be easily formed from these 16 sentences.

This method can also be employed by using word shape classes (and not word identities). For example, the output from a word shape recognizer could be used to classify the words in the sentence.

A third embodiment for detecting passionate sentences looks for long strings of short stop-word runs. This method is labeled as the LONG-SHORT method. The STOP list and the VANISH list in FIGS. 4–7 are preferably used in this embodiment. A short stop-word run would be any word or group of words containing either one stop word or one stop word with at least one vanish word. Long stop-word runs would be all other stop-word runs. The sentences (or blocks) containing long sequences of short stop-word runs are selected as being desirable text.

Figure 9:
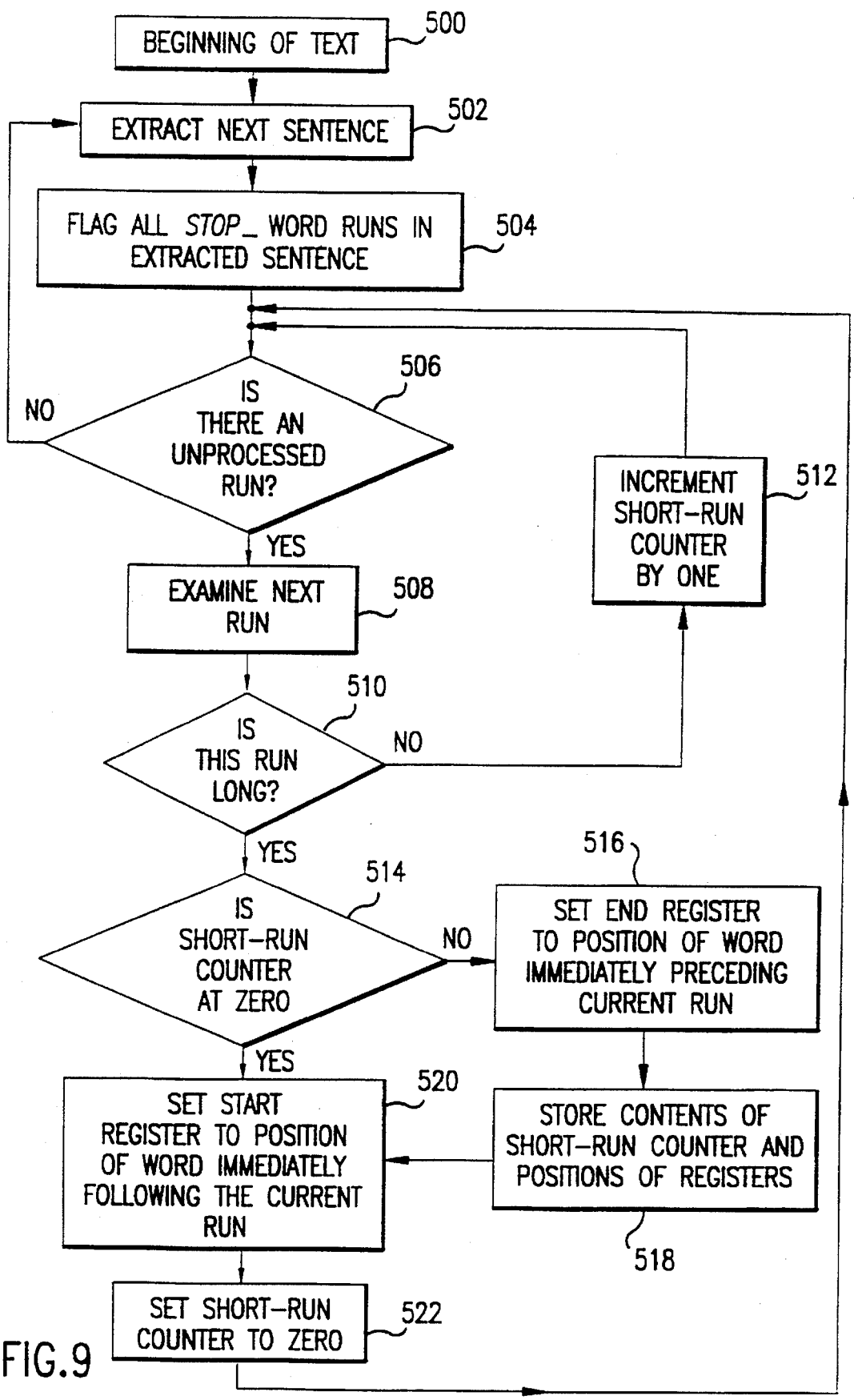
FIG. 9 is a flow diagram illustrating a method for selecting sentences (or other blocks of text) according to a third preferred embodiment.

Referring to FIG. 9, a flow diagram for selecting sentences (step 204 of FIG. 2) according to the third preferred embodiment is shown. At step 500, the start register is placed at the beginning of the text and a short-run counter is set to zero. At step 502, the first sentence of the document is extracted. All stop-word runs are identified in the extracted sentence in step 504.

In decision step 506, if there is an unprocessed stop-word run in the extracted sentence, then step 508 is executed. If the run is considered to be short in step 510, then the short-run counter is incremented by one in step 512. Flow returns to the decision step of 506. If all of the stop-word runs are processed, then flow returns to step 502 where the next sentence is extracted.

If the run is long in decision step 510, then the contents of the short-run counter are checked. If the short-run counter is zero, then step 520 positions the start register to the word immediately following the current stop-word run. In step 522, the short-run counter is set to zero and flow returns to decision step 506. If the short-run counter was not zero in step 514, then the end register is positioned to the word immediately preceding the current stop-word run in step 516. The content of the short-run counter is stored in step 518. Then the start register is positioned to the word immediately following the current run in step 520. After the short-run counter is set to zero, flow returns to decision step 506.

The following are two examples from the Shevardnadze speech. The short stop-word runs have a single underscore, and the long stop-word runs have a double underscore.

Ex. 1—<u>of</u> perestroika, <u>the</u> ideas <u>of</u> renewal, <u>the</u> ideas <u>of</u> democracy, <u>of</u> democratization. <u>We did</u> great work <u>on</u>

Ex. 2—<u>by the</u> events <u>of the first</u> day <u>of the</u> start <u>of the</u> work <u>of our</u> Congress; <u>by the</u> pressing <u>of a</u> button <u>the</u> fate not <u>only of a</u> president <u>but of</u> perestroika <u>and</u> democratization.

In the first example, the number of short stop-word run strings would be greater if "We" were on the VANISH list. In the second example, the number of short stop-word run strings would be greater if "first" were not on the STOP list.

This approach appears to be at least as powerful as the previous two embodiments, but requires some further attention as to which set of sentences are to be selected once a long-short run is identified. Selecting all sentences containing the long stop-word run or long stopword runs, which may be contained in several sentences, is at least reasonably effective.

In the second example above, six of the seven short stop-word runs would score "1" in either STOP/VANISH or SHORT methods. Therefore, the selection of corresponding sentences would have been likely in all three embodiments.

It is possible to use two or more of the above procedures to select passionate sentences for use in forming an abstract. The combination of two methods—or even all three—is easy. Because of the statistical differences between each method's detailed behavior, a combination of methods can be expected to perform even better than using only a single method.

A sentence's scores, which are derived by using two methods, can be combined by addition before selecting the passionate sentences. Ranking the sentences (or creating rank derived values) and adding together the results is another technique which could be used before selecting the passionate sentences. Alternatively, in view of the SHORT method, the STOP and VANISH lists could be modified to include only the short words and then either the STOP/VANISH or the LONG-SHORT methods could be applied. Of course, other combinations of these methods could be used to score the sentences.

Additionally, the invention can be used as part of an automatic document revision tool which would single out sentences that would not have been selected for an abstract (e.g., contrapassionate sentences) as candidates for possible revision. In the case of emphasis detection this would select unemphatic sentences for scrutiny, and possibly prompt the user (e.g., via display device 16) to consider revising the sentences. Alternatively, each sentence in the text might be annotated with its emphasis rating (optionally with coarse categories indicated by font changes; the most emphatic in bold, the middle in regular, and the least in italics) and any other information that seems relevant (e.g. sentence length).

Although the invention has been described and illustrated with particularity, it is intended to be illustrative of preferred embodiments. It is understood that the disclosure has been made by way of example only. Numerous changes in the combination and arrangements of the parts, steps, and features can be made by those skilled in the art without departing from the spirit and scope of the invention, as hereinafter claimed.

What is claimed is:

1. A method for automatically identifying regions of text from an electronic document using a digital computer, comprising the steps of:
   identifying stop words within the document;
   determining whether any of the identified stop words are vanish words;
   scoring regions of the document in response to the stop words and the vanish words in each of the regions; and
   identifying a predetermined number of regions of the document based on the score of the regions.

2. The method according to claim 1, wherein the regions of the document correspond to sentences.

3. The method according to claim 1, wherein the regions of the document correspond to paragraphs.

4. The method according to claim 1, wherein the stop words are identified by determining whether words in a region are on a predetermined STOP list.

5. The method according to claim 4, wherein the vanish words are determined by determining whether the identified stop words are on a predetermined VANISH list.

6. The method according to claim 5, wherein the scoring step includes:
   reducing the length of each stop-word run by eliminating the vanish words from each stop-word run to form reduced stop-word runs, wherein each stop-word run is a maximal group of adjacent stop words having at least one stop word; and
   combining the reduced stop-word runs in a predetermined manner to generate the score of the region.

7. The method according to claim 6, wherein the combining in the predetermined manner is performed so that a further reduction of the reduced stop-word runs has an effect of non-decreasing a value of the score.

8. The method according to claim 5, wherein the score of each region of the document is determined by:
   subtracting a total number of vanish words from a total number of stop words in a region to determine a result; and
   dividing the result by a total number of stop-word runs, wherein a stop-word run is a maximal group of adjacent stop words having at least one stop word.

9. The method according to claim 8, wherein a predetermined numeral is added to the result before dividing the result.

10. The method according to claim 5, wherein the score of each region is determined by selecting long sequences of short stop-word runs, wherein a short stopword run is a maximal group of adjacent stop words having either one stop word or one stop word with at least one vanish word.

11. The method according to claim 1, wherein the stop words are identified by determining whether words in the region have a length within a predetermined length range.

12. The method according to claim 11, wherein the predetermined length range is between one letter and three letters.

13. The method according to claim 11, wherein the vanish words are determined by determining whether each identified stop word has a second predetermined length within said predetermined length range.

14. The method according to claim 13, wherein the second predetermined length is either one letter or three letters.

15. The method according to claim 13, wherein the score of each region is determined by:
   counting a total number of stop-word runs having a non-vanish word in the region to determine a result, wherein the stop-word run is a maximal group of adjacent stop words having at least one stop word; and
   dividing the result by a total number of stop-word runs in the region to form a passion score.

16. The method according to claim 15, wherein a predetermined numeral is added to the result before dividing the result.

17. The method according to claim 14, wherein the score of each region is determined by:
   counting a total number of stop-word runs having all vanish words in the region, wherein the stopword run is a maximal group of adjacent stop words containing at least one stop word; and
   dividing the result by a total number of stop-word runs in the region to form a contrapassion score.

18. The method according to claim 17, wherein a predetermined numeral is added to the result before dividing the result.

19. The method according to claim 1, wherein a combination of one stop word immediately adjacent to one or more vanish words is counted as one stop word.

20. The method according to claim 1, wherein each word is represented by a word shape.

21. The method according to claim 1, further comprising outputting the predetermined number of regions as an abstract of the document with an output device.

22. The method according to claim 1, further comprising querying a user of said digital computer as to whether regions of the document having a predetermined score are to be edited.

23. A method for automatically scoring regions of text from an electronic document using a digital computer, comprising the steps of:
   identifying stop words within the document; and
   scoring regions of the document in response to a total number of stop words and relative locations of the stop words within the region.

24. The method according to claim 23, wherein the score of each region of the document is determined by dividing the total number of stop words by the total number of stop-word runs, wherein a stop-word run is a maximal group of adjacent stop words having at least one stop word.

25. The method according to claim 23, wherein a vanish word is identified by determining if the identified stop words are on a predetermined VANISH list.

26. The method according to claim 25, wherein the scoring step includes:

reducing the length of each stop-word run by eliminating the vanish words from each stop-word run to form reduced stop-word runs, wherein each stop-word run is a maximal group of adjacent stop words having at least one stop word; and combining the reduced stop-word runs in a predetermined manner to generate the score of the region.

27. The method according to claim 26, wherein the combining in the predetermined manner is performed so that a further reduction of the reduced stop-word runs has an effect of non-decreasing a value of the score.

28. The method according to claim 23, wherein the score of each region of the document is determined by:

subtracting a total number of vanish words from a total number of stop words in a region to determine a result; and dividing the result by a total number of stop-word runs, wherein a stop-word run is a maximal group of adjacent stop words having at least one stop word.

29. The method according to claim 28, wherein a predetermined numeral is added to the result before dividing the result.

30. The method according to claim 27, wherein the score of each region is determined by identifying long sequences of short stop-word runs, wherein a short stopword run is a maximal group of adjacent stop words having either one stop word or one stop word with at least one vanish word.

31. The method according to claim 25, wherein the stop words are identified by determining whether words in the region have a length within a first predetermined length range and a vanish word is identified by determining whether each identified stop word has a second predetermined length.

32. The method according to claim 31, wherein the first predetermined length range is between one letter and three letters, and the second predetermined length range is either one letter or three letters.

33. The method according to claim 31, wherein the score of each region is determined by:

counting a total number of stop-word runs having a non-vanish word in the region to determine a result, wherein the stop-word run is a maximal group of adjacent stop words having at least one stop word; and dividing the result by a total number of stop-word runs in the region to form a passion score.

34. The method according to claim 31, wherein the score of each region is determined by:

counting a total number of stop-word runs having all vanish words in the region, wherein the stopword run is a maximal group of adjacent stop words containing at least one stop word; and dividing the result by a total number of stop-word runs in the region to form a contrapassion score.

35. A method for automatically scoring sentences of text from an electronic document using a digital computer, comprising the steps of:

identifying stop words within the document; and scoring sentences of the document in response to a total number of stop words and relative locations of the stop words within the sentences.

36. The method according to claim 35, wherein the score of each sentence of the document is determined by dividing the total number of stop words by the total number of stop-word runs, wherein a stop-word run is a maximal group of adjacent stop words having at least one stop word.

37. The method according to claim 35, wherein a vanish word is identified by determining whether each stop word is on a predetermined VANISH list.

38. The method according to claim 37, wherein the score of each sentence of the document is determined by:

subtracting a total number of vanish words from a total number of stop words in a sentence to determine a result; and dividing the result by a total number of stop-word runs, wherein a stop-word run is a maximal group of adjacent stop words having at least one stop word.

39. The method according to claim 37, wherein the score of each sentence is determined by selecting long sequences of short stop-word runs, wherein a short stopword run is a maximal group of adjacent stop words having either one stop word or one stop word with at least one vanish word.

40. The method according to claim 35, wherein the stop words are identified by determining whether words in the sentence have a length within a first predetermined length range and a vanish word is identified by determining whether each identified stop word has a second predetermined length.

41. The method according to claim 40, wherein the first predetermined length range is between one letter and three letters, and the second predetermined length is to have either one letter or three letters.

42. The method according to claim 40, wherein the score of each sentence is determined by:

counting a total number of stop-word runs having a non-vanish word in the sentence to determine a result, wherein the stop-word run is a maximal group of adjacent stop words having at least one stop word; and dividing the result by a total number of stop-word runs in the sentence to form a passion score.

43. The method according to claim 40, wherein the score of each sentence is determined by:

counting a total number of stop-word runs having all vanish words in the sentence, wherein the stopword run is a maximal group of adjacent stop words containing at least one stop word; and dividing the result by a total number of stop-word runs in the sentence to form a contrapassion score.

44. An apparatus for automatically identifying regions of text from an electronic document, comprising:

means for identifying stop words within the document;

means for selecting regions of the document in response to a total number of stop words and relative locations of stop words within the region; and an output device which utilizes the selected regions.

45. The apparatus according to claim 44, further comprising an input means for inputting the document.

46. The apparatus according to claim 44, wherein the means for identifying and the means for selecting comprise a digital computer.

47. The apparatus according to claim 44, wherein the means for selecting each region of the document by determining a score of each region by dividing the total number of stop words by the total number of stop-word runs, wherein a stop-word run is a maximal group of adjacent stop words having at least one stop word.

48. The apparatus according to claim 44, wherein the means for selecting each region of the document is by selecting long sequences of short stop-word runs, wherein a short stop-word run is a maximal group of adjacent stop words having either one stop word or one stop word with at least one vanish word.

49. The apparatus according to claim 44, wherein the means for identifying stop words determines whether words in the region have a length within a first predetermined length range and identifies a vanish word by determining whether each identified stop word has a second predetermined length.

50. The apparatus according to claim 49, wherein the means for selecting each region by determining a score of each region by:

counting a total number of stop-word runs having a non-vanish word in the region to determine a result, wherein the stop-word run is a maximal group of adjacent stop words having at least one stop word; and dividing the result by a total number of stop-word runs in the region to form a passion score.

51. The apparatus according to claim 49, wherein the means for selecting each region by determining a score of each region by:

counting a total number of stop-word runs having all vanish words in the region, wherein the stopword run is a maximal group of adjacent stop words containing at least one stop word; and dividing the result by a total number of stop-word runs in the region to form a contrapassion score.

52. An apparatus for automatically identifying regions of text from an electronic document, comprising:

means for identifying stop words within the document;

means for scoring regions of the document for selecting a predetermined number of regions of the document, the score being based on a total number of stop words and relative locations of stop words within the region; and an output device which utilizes the scoring of the regions.

53. The apparatus according to claim 52, further comprising an input means for inputting the document.

54. The apparatus according to claim 52, wherein the means for identifying and the means for scoring comprise a digital computer.

55. The apparatus according to claim 52, wherein the means for scoring each region of the document determines the score by dividing the total number of stop words by the total number of stop-word runs, wherein a stop-word run is a maximal group of adjacent stop words having at least one stop word.

56. The apparatus according to claim 52, wherein the means for scoring each region of the document is by selecting long sequences of short stop-word runs, wherein a short stop-word run is a maximal group of adjacent stop words having either one stop word or one stop word with at least one vanish word.

57. The apparatus according to claim 52, wherein the means for identifying stop words determines whether words in the region have a length within a first predetermined length range and identifies a vanish word is identified by determining whether each identified stop word has one of a set of predetermined lengths.

58. The apparatus according to claim 57, wherein the means for scoring each region determines the score by:

counting a total number of stop-word runs having a non-vanish word in the region to determine a result, wherein the stop-word run is a maximal group of adjacent stop words having at least one stop word; and dividing the result by a total number of stop-word runs in the region to form a passion score.

59. The apparatus according to claim 57, wherein the means for scoring each region determines the score by:

counting a total number of stop-word runs having all vanish words in the region, wherein the stopword run is a maximal group of adjacent stop words containing at least one stop word; and dividing the result by a total number of stop-word runs in the region to form a contrapassion score.

* * * * *